United States Patent Office 2,939,895
Patented June 7, 1960

2,939,895
CONDUCTING CHEMICAL REACTIONS IN AN UNDERGROUND STORAGE CAVERN

Howard V. Hess, Glenham, and Edward R. Christensen, Beacon, N.Y., and Herbert E. Vermillion, Port Arthur, Tex., assignors to Texaco Inc., a corporation of Delaware No Drawing. Filed Nov. 13, 1956, Ser. No. 621,530

10 Claims. (Cl. 260—683.66)

The present invention relates to a novel method for preventing contact between first and second incompatible liquids of different specific gravities which are contained in a vessel, and is particularly concerned with carrying out chemical reactions in an underground storage cavern having a residual body of brine or other water solution therein which is kept from contact with the chemical reactants by the novel means of a barrier layer interposed between the water solution and the reactants.

It is feasible to perform many types of chemical reactions in huge underground storage caverns such as may be washed out in salt and clay beds. Such caverns are particularly suited for producing changes in hydrocarbons by slow reactions carried out over a long period of time at relatively low temperatures. Examples of chemical reactions which can be so performed, and to which our invention is applicable, are the isomerization of normal paraffins, cycloparaffins, and normal olefins to the corresponding iso compounds; alkylation of an olefin having a relatively small number of carbon atoms with an isoparaffin to form hydrocarbons having a relatively large number of carbon atoms and a high octane number; the conversion of straight chain hydrocarbons to the corresponding cyclo compounds; and the polymerization of olefins. Others are hydrogenation, dehydrogenation, and oxo (reaction of CO and $H_2$ with unsaturated hydrocarbons to produce oxygenated compounds), all of which require high pressures such as can be developed easily and safely underground. Still others are the bromination, chlorination, and nitration of saturated hydrocarbons to make them reactive; and the fermentation of carbohydrates.

In accordance with the invention of the above application, such chemical reactions are safely performed over a long period of time at low cost by introducing the reactants into a cavern located deep within the earth (for example, 1000–2000 feet down), contacting the reactants with a catalyst effective to promote the desired chemical reaction, and maintaining the reactants in contact with the catalyst in the underground cavern for a period of time sufficient to effect the chemical reaction in a substantial amount.

It is generally unnecessary to add heat by fuel combustion because the temperature existing within the earth, for example 100–200° F. at feasible cavern depths, is sufficient for the chemical reaction over a long period of time, such as six months to two years. However, some additional heat can be added by circulating a stream of the reactants through a conventional heat exchanger at the surface before introduction into the cavern; or even after introduction a continuous circulation of all or a portion of the reactants through such a heat exchanger may be maintained. The pressure on the reactants will at least be that due to the column of liquid above the bottom of the cavern, pressures of 300–400 pounds per square inch (p.s.i.) being maintained easily, and even higher pressures up to several thousand pounds per square inch being maintained by applying pressure from the surface on the liquid column.

Separation of the converted from the unconverted material is accomplished in any suitable way, as by withdrawing the liquid material from the cavern and distilling it in a conventional manner. Unconverted material can then be returned to the cavern for conversion.

An underground cavern of the type required for performing our method advantageously is formed within a natural salt formation such as a dome or bed by first drilling a hole from the surface down into the salt formation, inserting conduits for fluid flow, and circulating water down into the formation to dissolve the salt which is then carried up to the surface as brine. For example, a cavern about 20–40 feet in diameter and about 1,000–2,000 feet in length can be formed within a salt dome located about 1,000 feet below the surface of the earth. Caverns having capacities of over 4 million gallons have been formed in this way, but both smaller and larger sizes are feasible.

A cavern similarly may be washed out of a clay bed by using a deflocculating liquid solution. Reference is made to Patent 2,803,432, issued August 20, 1957, for such a procedure.

The completed cavern is full of brine or other solution which should be removed to provide space for the chemical reactants. This can be done by forcing the lighter reactants down on the top of the brine which is thus forced up through a pipe to the surface. It is almost impossible to effect complete removal of brine so that there usually is a shallow pool of brine in the bottom of a cavern. This brine may deleteriously affect the chemical reaction by polluting the chemical reactants and by poisoning the catalyst.

In accordance with the present invention, the deleterious effect of the brine or other water solution in a cavern is counteracted by floating on its surface a barrier layer of a material which is insoluble in, and inert or unreactive with, both the brine and the chemical reactants, and which has a specific gravity intermediate such two liquids.

We prefer to use a barrier layer comprising a flexible impervious continuous unitary film or sheet of a plastic material which is insoluble in both the water solution and the hydrocarbon or other chemical reactants, and is unaffected by the catalyst. While many well known plastic materials can be used successfully we consider to be especially advantageous cyclized natural or synthetic (butyl or buna) rubber, chlorinated synthetic rubber, polymerized methacrylate resin, and cellulose gum.

It is generally most advantageous to form such a barrier layer in situ by dissolving the plastic material in a suitable solvent which itself is soluble in either or both of the water and reactant layers. This solution is introduced on the top of the water and then the reactants are introduced on the top of the layer of solution. Subsequently the solvent gradually dissolves in the water or the reactants, leaving the plastic layer as a barrier between.

Examples of suitable materials to introduce for forming barrier layers are a solution of chlorinated synthetic rubber known as Pliolite in a ketone solvent such as acetone or methylethyl ketone, a solution of carboxy methyl cellulose gum in diethylene glycol, and a solution of one or both of lauryl and octyl methacrylate polymers in a petroleum oil solvent to form a solution, for example containing 40% of the methacrylate by weight (known as Acryloid No. 710).

A barrier layer formed as described above is particularly advantageous because it will effectively separate the upper and lower liquid layers while preventing migration therebetween, and because it will rise and fall with the lower control liquid as reactants are introduced in or removed from the reactor.

While the principles of the present invention may be applied to any type of chemical reaction performed in a vessel containing a pool of liquid, such as brine, which must be kept from contact with the reactants and catalysts, it is particularly applicable to isomerization, alkylation, cyclo conversion, polymerization, hydrogenation, and oxygenation.

In an isomerization reaction, relatively short chain light paraffin hydrocarbons such as butane, and also the corresponding olefins, are converted to the corresponding iso compounds. The barrier material is introduced on the top of the brine to form a layer of suitable thickness, such as one inch to six inches thick. The liquid normal hydrocarbon, such as butane, is then introduced into the storage cavern on top of the barrier layer and the pool of brine. A suitable catalyst is added to the hydrocarbon before or after introduction. Among such catalysts are aluminum chloride, hydrogen fluoride, boron trifluoride, and aluminum bromide. The reactants are then retained in the cavern for a sufficient time to effect substantial conversion to the desired iso compounds this time sometimes being as long as six months or a year.

In alkylation, relatively short chain isoparaffin hydrocarbons are reacted with relatively short chain olefins to produce longer chain saturated isoparaffin hydrocarbons. For example isobutane and butylene can be applied on the top of the barrier layer and brine in a cavern in a ratio of approximately 5:1 by weight, and provided with catalyst such as boron trifluoride or a boron trifluoride-hydrogen fluoride mixture. The reaction mixture is then allowed to remain in the cavern until the reaction has occurred. If desired, the alkylation can proceed with n-butane instead of isobutane by using a catalyst which is active for both isomerization and alkylation, for example aluminum chloride and bromide, concentrated sulfuric acid, boron trifluoride, hydrogen fluoride-boron trifluoride, and potassium hydrogen fluoride.

In cyclo conversion a straight chain hydrocarbon such as n-hexane is converted to the corresponding cyclo compound on top of the barrier layer. Suitable catalysts are platinum, nickel and cobalt.

In polymerization, unsaturated aliphatic hydrocarbons such as ethylene, propylene and butylene are polymerized on top of a barrier layer with a catalyst such as hydrated phosphoric acid, or with a silica-alumina base impregnated with the oxides of group VI of the periodic table.

In hydrogenation a material such as crude oil, naphtha, or diesel fuel is introduced into a cavern on top of a barrier layer and treated wtih hydrogen in the presence of a catalyst such as cobalt molybdate, nickel-tungsten sulfide, or nickel.

In oxygenation (Oxo) a cobalt carbonyl catalyst is dissolved in an olefin such as ethylene or propylene which is introduced into a cavern on top of a barrier layer. Gaseous hydrogen and carbon monoxide in ratios of 1:1 by volume are then pumped down into the cavern to effect reaction.

The following Examples I to IV describe laboratory experiments simulating on a small scale chemical reaction intended for underground caverns.

*Example I*

A glass laboratory vessel partially filled with a salt water solution was used for the conversion of normal pentane to isopentane. On the top of the salt water solution there was placed a ⅛ inch thick barrier layer of a solution of 43% by weight of synthetic rubber in methylethyl ketone, and this was followed by introducing on the top of the barrier layer a quantity of liquid normal pentane containing in solution 10% by weight of a catalyst comprising aluminum bromide, traces of hydrogen bromide and a small quantity of olefin. The methylethyl ketone migrated into the water and after a few hours a flexible unitary sheet of chlorinated rubber was left as the barrier. After holding the vessel at room temperature of 65–75° F. for a period of 144 hours samples were removed, and it was found that the upper layer of reactants had been converted to contain 4% of isobutane and 44% of isopentane by weight.

*Example II*

A salt water solution in each of a series of laboratory glass vessels was covered with a ⅛ inch thick barrier layer of a solution of a mixture of polymerized lauryl and octyl methacrylates in a pentane soluble petroleum oil base wherein the solution contained 40% of methacrylate by weight. Liquid normal pentane was then introduced on the top of the barrier layer in each vessel and various amounts of aluminum bromide catalyst containing traces of hydrogen bromide and olefin were dissolved in the pentane in the different vessels. A flexible unitary skin of methacrylate polymers formed upon migration of the oil into the pentane. Samples were removed at intervals and analyzed for isopentane, the results being a tabulated below:

| Percent AlBr$_3$ | No. of Hrs. | Percent i-C$_5$ |
|---|---|---|
| 2.8 | 168 | 44 |
|  | 336 | 51 |
| 3.6 | 168 | 43.4 |
|  | 336 | 39.6 |
| 5 | 96 | 39 |
| 10 | 144 | 44 |

*Example III*

A similar reaction with normal pentane was performed, using as the barrier a ⅛ inch thick layer of carboxy methyl cellulose gum dissolved in diethylene glycol in such quantity that the solution had a 120 viscosity number. 10% by weight of aluminum bromide was dissolved in the normal pentane. After 24 hours at room temperature the reactants analyzed 6.6% isopentane.

*Example IV*

In a reaction as in Example III, but using 10% of aluminum chloride as catalyst, the reactants contained 32.7% of isopentane after 504 hours reaction at room temperature.

*Example V*

A storage cavern roughly 20 feet in diameter and 500 feet long located 1000 feet below the surface, within a salt dome, contains a pool of residual brine three feet deep. Into this cavern there is introduced 605 pounds of acetone having 25% of chlorinated synthetic rubber dissolved therein to provide a barrier layer floating on the top of the brine pool.

The rest of the cavity is then substantially filled with liquid butane floating upon the barrier layer and thus effectively separated from contact with the brine. Hydrogen fluoride-boron trifluoride catalyst is then introduced into the butane and distributed uniformly therein.

After six months storage in the cavern the upper layer is removed by pumping in brine to displace the upper layer while the floating rubber barrier also rises to maintain separation of the phases. The isobutane is then separated from the normal butane by distillation.

It is evident that the principles of the present invention are primarily applicable to conducting chemical reactions in vessels such as huge underground storage caverns as described above. However, it should be clearly understood that they also apply in any situation where it is necessary to prevent contact between two incompatible liquids of different specific gravities contained in a vessel of any type, whether on a laboratory scale or in a plant size reactor.

Obviously, many modifications and variations of the invention, as hereinbefore set forth, may be made without departing from the spirit and scope therof, and therefore only such limitations should be imposed as are indicated in the appended claims.

We claim:

1. A method for conducting a catalytic chemical reaction in a first pool of a reactant liquid chemical having a catalyst associated therewith in an underground storage cavern located in an earth formation, said cavern containing a second pool of liquid comprising water having a specific gravity greater than said first pool, said method comprising introducing on the top of said second pool a floating layer of a solution of a plastic material in a solvent which is miscible with the liquid of at least one of said first and second pools, said plastic material and said solution thereof having a specific gravity intermediate said first and second pools, and then introducing on the top of said layer said pool of reactant liquid chemical having catalyst associated therewith, said solvent then migrating from said solution into at least one of said first and second pools and leaving a continuous unitary sheet of plastic material floating between said first and second pools as a flexible impervious barrier spacing said first and second pools vertically from one another.

2. A method in accordance with claim 1 wherein said earth formation is salt and said first named pool is brine.

3. A method in accordance with claim 1 wherein said second liquid is a normal hydrocarbon containing an isomerization catalyst, and wherein said plastic material is rubber.

4. A method in accordance with claim 1 wherein said reactant liquid chemical is a normal hydrocarbon, and said catalyst is an isomerization catalyst.

5. A method in accordance with claim 1 wherein said reactant liquid is a cycloparaffin hydrocarbon and said catalyst is an isomerization catalyst.

6. A method in accordance with claim 1, wherein said reactant liquid is a paraffin hydrocarbon, and said catalyst is effective to convert said paraffin hydrocarbon to the corresponding cycloparaffin.

7. A method in accordance with claim 1 wherein said reactant liquid is a mixture of an isoparaffin hydrocarbon and an olefin hydrocarbon, and said catalyst is an alkylation catalyst.

8. A method in accordance with claim 1 wherein said reactant liquid is an olefin hydrocarbon, and said catalyst is a polymerization catalyst.

9. A method in accordance with claim 1 wherein said reactant liquid is an olefin and said catalyst is an oxygenation catalyst, said method also comprising introducing hydrogen and carbon monoxide into contact with said olefin in said cavern.

10. A method in accordance with claim 1 wherein said first named inert barrier material is a substance selected from the group consisting of rubber, methacrylate resins, and cellulose gum.

References Cited in the file of this patent

UNITED STATES PATENTS

| | | |
|---|---|---|
| 1,047,747 | Rowe | Oct. 7, 1913 |
| 2,001,350 | Mills | May 14, 1935 |
| 2,104,488 | Kennedy et al. | Jan. 4, 1938 |
| 2,265,962 | Bent et al. | Dec. 9, 1941 |
| 2,327,066 | Roelen | Aug. 17, 1943 |
| 2,330,079 | Owen | Sept. 21, 1943 |
| 2,383,123 | Gorin | Aug. 21, 1945 |
| 2,579,005 | Lambert | Dec. 18, 1951 |
| 2,595,979 | Pevere et al. | May 6, 1952 |
| 2,677,666 | Dougherty | May 4, 1954 |

FOREIGN PATENTS

| | | |
|---|---|---|
| 131,131 | Australia | Jan. 24, 1949 |

OTHER REFERENCES

Cozzens: "Petroleum Engineer," vol. 13, page 162, February 1942.